United States Patent
Hashima et al.

(10) Patent No.: US 7,958,462 B2
(45) Date of Patent: Jun. 7, 2011

(54) COMPUTER-READABLE NON-TRANSITORY MEDIUM STORING THREE-DIMENSIONAL DEVICE SIMULATION PROGRAM AND THREE-DIMENSIONAL DEVICE SIMULATION SYSTEM

(75) Inventors: Masayoshi Hashima, Kawasaki (JP); Yuichi Sato, Kawasaki (JP); Shuji Takeshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 177 days.

(21) Appl. No.: 11/443,200

(22) Filed: May 31, 2006

(65) Prior Publication Data

US 2007/0198114 A1 Aug. 23, 2007

(30) Foreign Application Priority Data

Feb. 21, 2006 (JP) .................. 2006-043812

(51) Int. Cl.
  *G06F 17/50* (2006.01)
(52) U.S. Cl. .............................. 716/50; 716/51; 716/52
(58) Field of Classification Search .............. 716/19–21, 716/50–56
  See application file for complete search history.

(56) References Cited

U.S. PATENT DOCUMENTS

| | | | | |
|---|---|---|---|---|
| 5,067,101 A * | 11/1991 | Kunikiyo et al. | ............... | 716/20 |
| 6,909,930 B2 * | 6/2005 | Shishido et al. | .............. | 700/121 |
| 2002/0159167 A1 * | 10/2002 | Greenberg | .................... | 359/738 |
| 2004/0101786 A1 * | 5/2004 | Meagley | ........................ | 430/322 |
| 2005/0048780 A1 * | 3/2005 | Tanaka et al. | ................. | 438/689 |
| 2006/0199369 A1 * | 9/2006 | Marokkey et al. | ............ | 438/620 |

FOREIGN PATENT DOCUMENTS

| | | |
|---|---|---|
| JP | 10-41366 | 2/1998 |
| JP | 2000-207433 | 7/2000 |
| JP | 2001-174974 | 6/2001 |
| JP | 2001-230323 A | 8/2001 |

OTHER PUBLICATIONS

Japan Patent Office; Office Action mailed Jun. 1 2010, in connection with correspondent patent application No. JP 2006-043812. English-language translation provided.

* cited by examiner

*Primary Examiner* — Paul Dinh
(74) *Attorney, Agent, or Firm* — Fujitsu Patent Center

(57) ABSTRACT

A computer executable three-dimensional device simulation program product for the purpose of making a three-dimensional device simulation system which generates a three-dimensional model of a device by using a mask data performing the procedures of inputting cross-sectional feature information indicating a cross-sectional feature of an edge part of a mask, and calculating the three-dimensional model based on the mask data and input cross-sectional feature information, thereby enabling an easy generation of a complex three-dimensional feature by using pattern forming-use mask data when generating a three-dimensional feature model of a minute device.

9 Claims, 18 Drawing Sheets

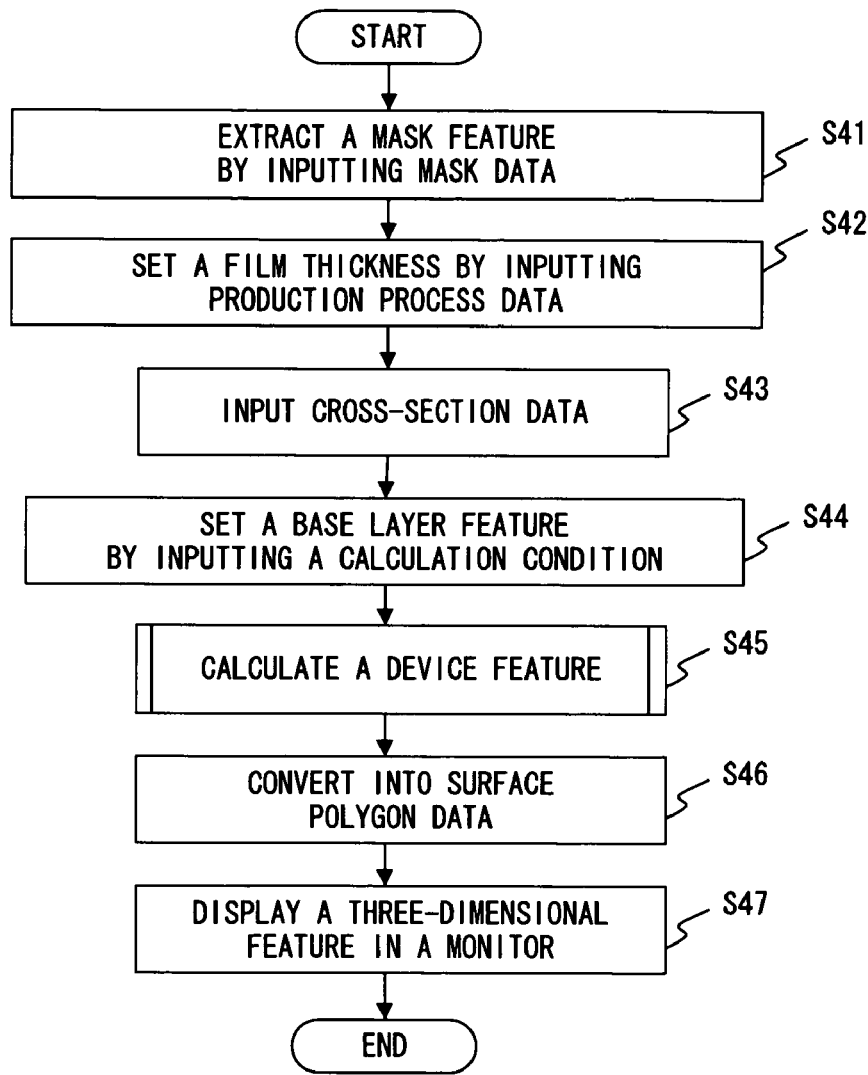
F I G. 4

| | A | B | C | D | E | F | G | H | I | J | K | L |
|---|---|---|---|---|---|---|---|---|---|---|---|---|
| 1 | | | | | | | | | | | | |
| 2 | | | | | | | | | | | | |
| 3 | | | | GENERATION PROCESS | 7 | | | | | | | |
| 4 | | | | | | | | | | | | |
| 5 | | | | | | | | | | | | |
| 6 | | | | | [mm] | | | | MASK EDGE FEATURE PARAMETERS [μm] | | | |
| 7 | | NO. | PROCESS ID | TYPE | THICKNESS | MASK FILE NAME | POS./NEG. | EDGE PATTERN | X OFFSET | Y OFFSET | EDGE OFFSET | SLOPE VARIABLE |
| 8 | | 0 | BASE | BASE | | | | | | | | |
| 9 | | 1 | LAYER1 | DEPOSITION | 0.3 | Lay_1 | POSITIVE | VERTICAL EDGE | 0 | 0 | 0 | 0 |
| 10 | | 2 | LAYER2 | DEPOSITION | 0.03 | Lay_2 | NEGATIVE | STRAIGHT LINE SLOPE | 0 | 0 | 0.01 | 1 |
| 11 | | 3 | LAYER3 | ETCHING | 0.01 | Lay_3 | POSITIVE | EXPONENTIAL SLOPE | 0 | 0 | 0.02 | 0.1 |
| 12 | | 4 | LAYER4 | DEPOSITION | 0.02 | Lay_4 | POSITIVE | EXPONENTIAL SLOPE | 0 | 0 | 0.02 | 0.2 |
| 13 | | 5 | LAYER5 | ETCHING | 0.03 | Lay_5 | NEGATIVE | STRAIGHT LINE SLOPE | 0 | 0 | 0 | 0.1 |
| 14 | | 6 | LAYER6 | DEPOSITION | 0.05 | Lay_6 | NEGATIVE | STRAIGHT LINE SLOPE | 0 | 0 | 0 | 0.2 |
| 15 | | 7 | LAYER7 | SMOOTHING | 0.6 | Lay_7 | POSITIVE | VERTICAL EDGE | 0 | 0 | 0 | 0 |
| 16 | | | | | | | | | | | | |
| 17 | | | | | | | | | | | | |

FIG. 6

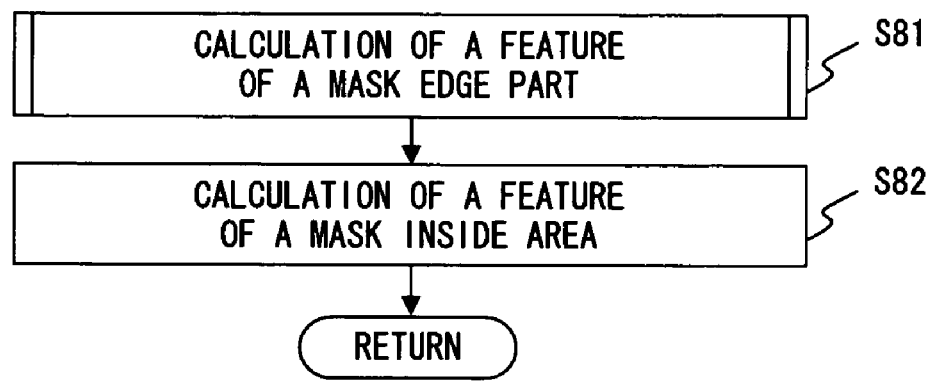
F I G. 8

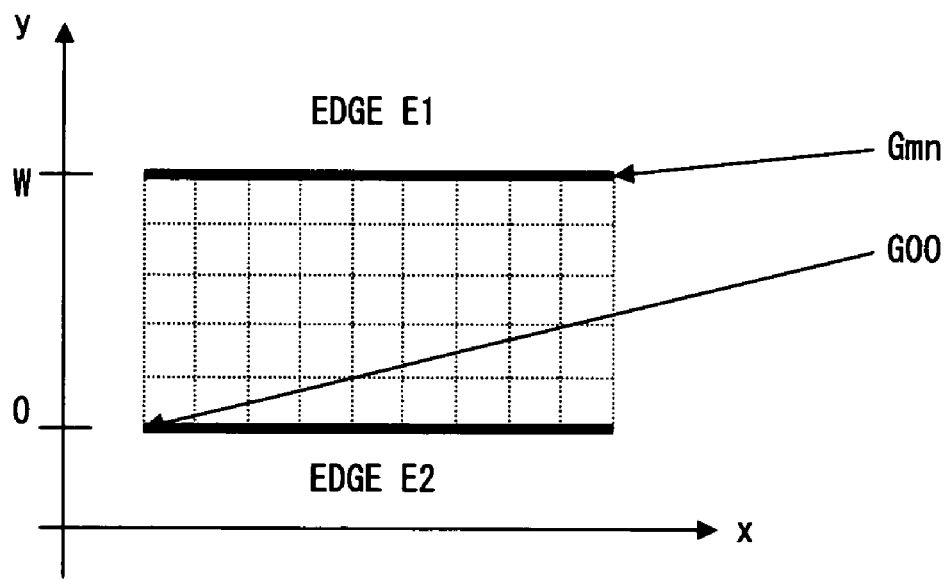
F I G. 1 1

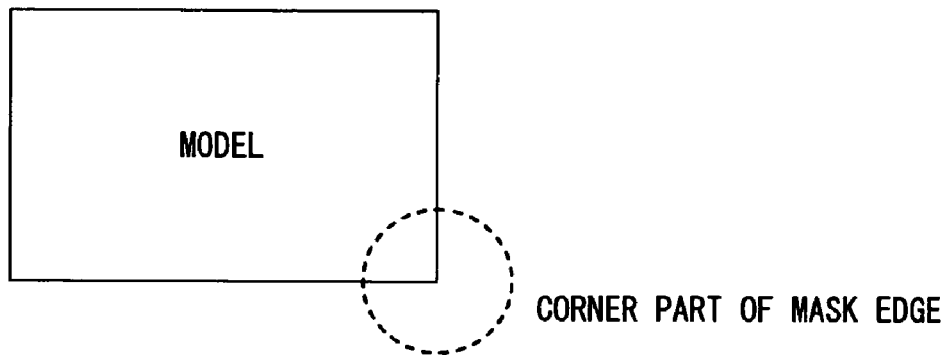
F I G. 1 3

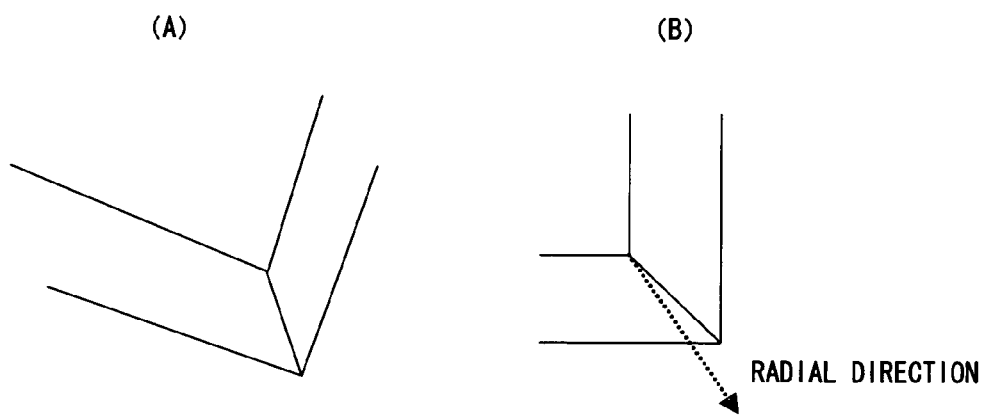
F I G. 1 4

COMPUTER-READABLE NON-TRANSITORY MEDIUM STORING THREE-DIMENSIONAL DEVICE SIMULATION PROGRAM AND THREE-DIMENSIONAL DEVICE SIMULATION SYSTEM

BACKGROUND OF THE INVENTION

1. Field of the Invention

The present invention relates to a design/production technique for micro/nano-devices such as a semiconductor device, MEMS (micro electro mechanical system) device, HDD (hard disk drive) head, et cetera, and in particular to a three-dimensional device simulation program product and a three-dimensional device simulation system for generating a three-dimensional feature model required for a performance simulation of a device, for example.

2. Description of the Related Art

There is a disclosed conventional technique capable of importing a feature pattern that is imaged for each production process, generating a layer image by adding characteristic data of each production process to the feature pattern, acquiring a feature correlation from image data and mask pattern data which are imported in each production process, and simulating a feature at the time of producing from a mask pattern feature by using the correlation information (e.g., refer to Laid-Open Japanese Patent Application Publication No. 10-41366).

There is also a disclosed conventional technique for generating a three-dimensional feature by adding a conversion of the height direction to two-dimensional mask data and by further adding a conversion by using knowledge information reflecting a structure. Thereby generating a correct three-dimensional feature allowing an accurate extraction of parameters for performing a characteristic simulation of a semiconductor device from two-dimensional mask data in a three-dimensional feature generation method for generating three-dimensional feature data by using mask data that is two-dimensional data (e.g., refer to Laid-Open Japanese Patent Application Publication No. 2000-207433).

There is also a disclosed conventional technique for changing an optical intensity simulation model according to a mask pattern feature and a positional relationship of mask patterns, and performing an optical proximity effect correction (OPC) of a simulation base by changing the number of repetition of the optical intensity simulation, thereby making it possible to perform the OPCs for all mask patterns within a chip and suppress an increase of time length required for the OPC (e.g., refer to Laid-Open Japanese Patent Application Publication No. 2001-174974).

In recent years, the progress decreasing device size has placed an increased importance in a device's performance simulation by a computer. However, generation of a three-dimensional feature model for a simulation requires a very large amount of work time. For example, three-dimensional models are sometimes manually generated by using a mechanical three-dimensional computer aided design (CAD) program. Wherein a complex device may require several hours to generate the model.

As another model generation technique, a method exists for generating a three-dimensional feature of a device by using a simulator for a production process. This method simulates a production process such as etching, sputtering, et cetera, thereby calculating a device feature in detail. This method, however, only allows a partial modeling because of the difficulty of performing an accurate simulation, and because it takes several hours just to calculate a narrow area.

Although there is a method for performing a three-dimensional simulation of an entire device in a MEMS-use simulation system, the method is only capable of generating a simple three-dimensional model. Hence, it is capable of handling only a simple feature in a MEM device.

FIG. 1 is a drawing that depicts a conventional technique.

The conventional MEMS-use simulation system is used for generating a model of a simple three-dimensional feature as shown in FIG. 1 (B) by ejecting a simple featured mask as shown by FIG. 1 (A).

Other examples relating to modeling of a device include an offset method and a level set method; both of which are techniques mainly used for process simulation.

In comparison, three-dimensional features are becoming increasingly complex, large scaled and multi-layered while devices are decreasing in size. Therefore, the demand for more effective methods for generating three-dimensional feature models is increasing.

SUMMARY OF THE INVENTION

In consideration of the above noted situation, the purpose of the present invention is to provide a three-dimensional device simulation program product and a three-dimensional device simulation system that are capable of simply generating a complex three-dimensional feature by using a mask by specifying a cross-sectional feature of a mask edge part when generating a three-dimensional feature model of micro/nano-devices.

The present invention is configured as described in the following for the purpose of solving the above-described problem.

According to an aspect of the present invention, a three-dimensional device simulation program product makes a three-dimensional device simulation system, which generates a three-dimensional model of a device by using mask data, carries out the procedure of inputting cross-sectional feature information indicating a cross-sectional feature of an edge part of a mask; and calculates the three-dimensional model based on the mask data and input cross-sectional feature information.

The three-dimensional device simulation program product, according to the present invention, is preferably configured so that the cross-sectional feature information expresses a cross-sectional feature of the edge part by a function, and inputs the cross-sectional feature information by specifying a parameter of the function.

The three-dimensional device simulation program product, according to the present invention, is preferably configured so that the cross-sectional feature information indicates a cross-sectional feature of the edge part by using contour data extracted from a cross-sectional photograph.

The three-dimensional device simulation program product, according to the present invention, is preferably configured to further comprise the procedure of generating an uneven surface feature as a three-dimensional feature of the edge part.

According to another aspect of the present invention, a three-dimensional device simulation system for generating a three-dimensional model of a device by using mask data comprises: a cross-sectional feature input unit for inputting cross-sectional feature information indicating a cross-sectional feature of an edge part of a mask, and a three-dimensional model calculation unit for calculating the three-dimensional model based on the mask data and cross-sectional feature information input by the cross-sectional feature input unit.

BRIEF DESCRIPTION OF THE DRAWINGS

FIG. 4 is a flowchart showing a flow of a three-dimensional device simulation process carried out in a three-dimensional device simulation system;

FIG. 6 is a chart exemplifying production process data that is input;

FIG. 8 is a flow chart showing a flow of a subroutine of "calculation of a device feature";

FIG. 11 is a chart describing a calculation of an edge slope feature (part 1);

FIG. 13 is a drawing depicting a method for generating a corner part of a model (part 1);

FIG. 14 is a drawing depicting a method for generating a corner part of a model (part 2);

DESCRIPTION OF THE PREFERRED EMBODIMENTS

The following is a description of the preferred embodiment of the present invention based on the accompanying drawings.

Figure 1:
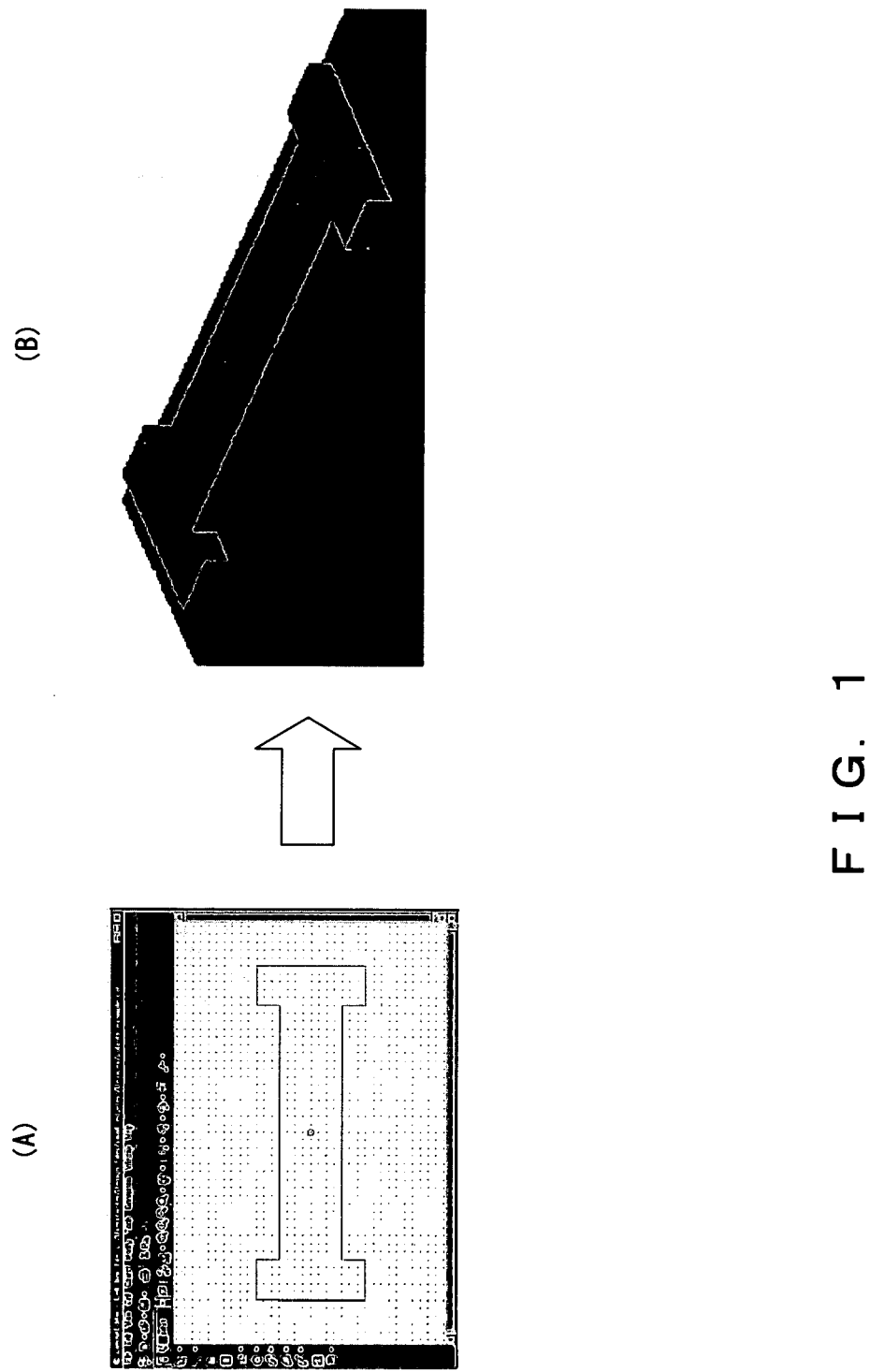
FIG. 1 is a drawing depicting a conventional technique.
Figure 2A:
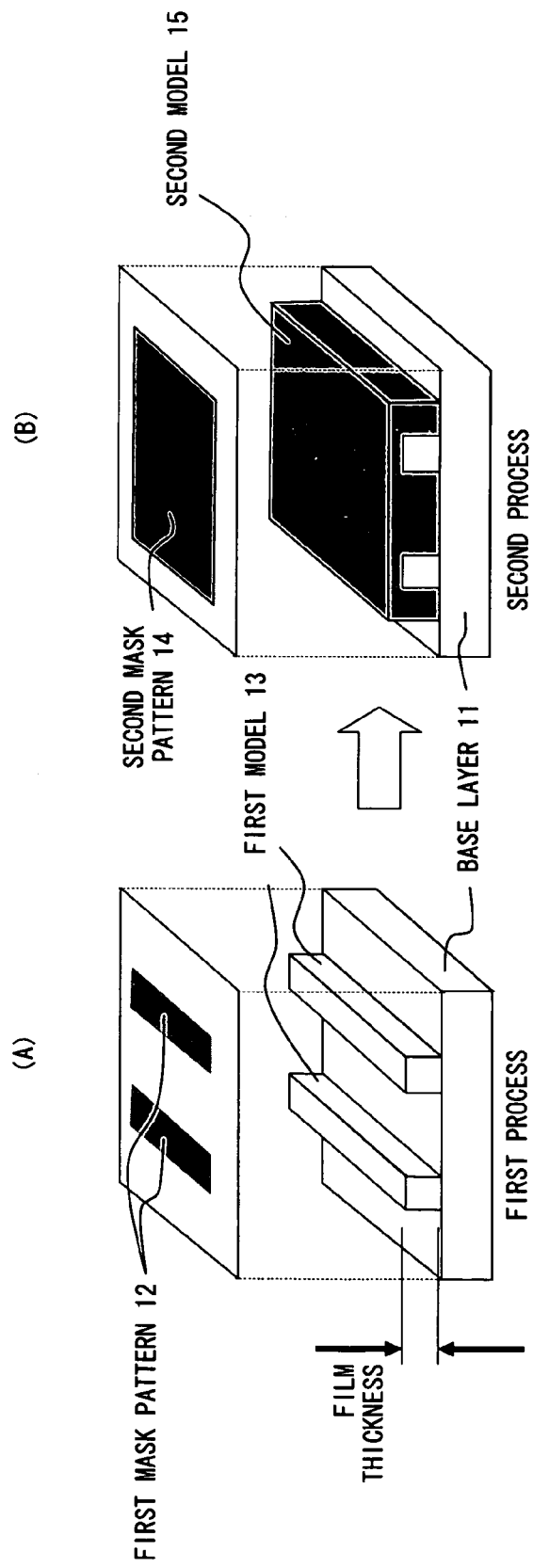
FIG. 2A is a drawing depicting a method for generating a simple model.

FIG. 2A is a drawing for describing a method for generating a simple model.

A multi-layer thin film structure for a device is formed through a plurality of production processes. For example, a first model 13 is generated as a result of ejecting a first mask pattern 12 onto a base layer 11 in the first process as shown in FIG. 2A (A). A second model 15 is generated as a result of ejecting a second mask pattern 14 overlapping with the first model 13 in the second process as shown in FIG. 2A (B). As such, an outline of a final feature of a device can simply be configured by a pattern feature and its film thickness of a mask pattern as shown in FIG. 2A (B), except for a temporary film such as a registration. In this case, although the mask edge parts of the first model 13 and second model 15 are ideal vertical side surfaces, models having a variously featured mask edge parts are generated on actual devices due to characteristics of the production process.

Figure 2B:
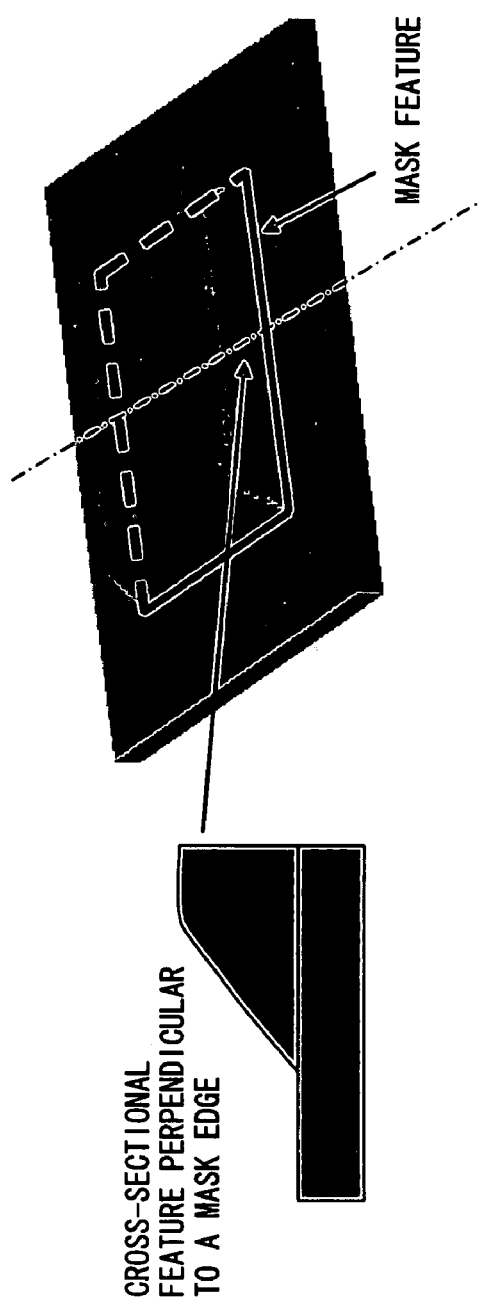
FIG. 2B is a drawing depicting a model specifying a cross-section of a mask edge.

FIG. 2B is a drawing for describing a model specifying a cross-section of a mask edge.

As described above, an actual device has a variously featured mask edge part. In order to reproduce the feature of the mask edge part, the present invention is configured to specify a cross-dimensional feature of a mask edge part and generate a three-dimensional feature thereof based on the cross-sectional feature. This configuration makes it possible to generate a three-dimensional device model having a discretionary mask edge feature by a small amount of process time.

Furthermore, it is possible to generate a model by a simple setup by patternization of a cross-sectional feature of a mask edge part by an exponential function, a trigonometrical function, et cetera, in advance, or by importation of a cross-sectional feature from a cross-sectional photograph such as an electron microscope picture.

Figure 3:
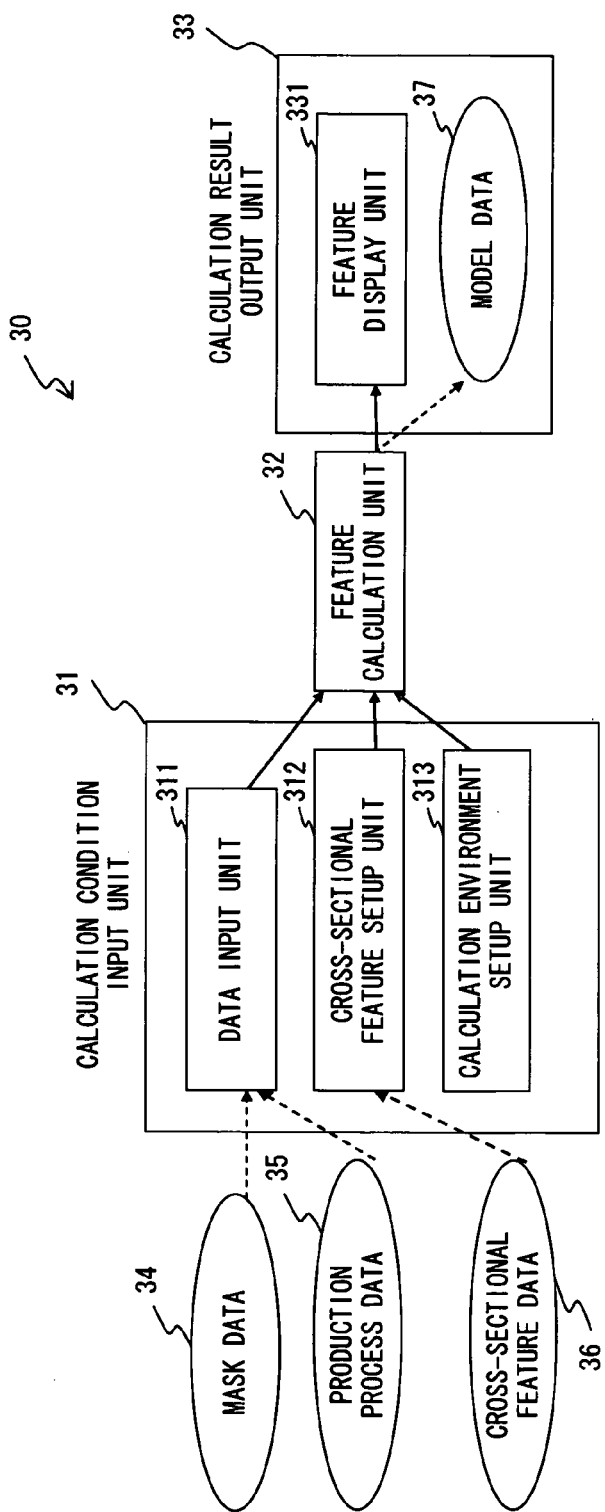
FIG. 3 is a diagram depicting an outline of a three-dimensional device simulation system applied by the present invention.

FIG. 3 is a diagram for describing an outline of a three-dimensional device simulation system applied by the present invention.

Referring to FIG. 3, a three-dimensional device simulation system 30 comprises a calculation condition input unit 31 for setting and inputting a condition for generating a model, a feature calculation unit 32 for calculating a feature of a model and a calculation result output unit 33 for outputting a result of the calculation. The calculation condition input unit 31 comprises a data input unit 311, a cross-sectional feature setup unit 312 and a calculation environment setup unit 313. The calculation result output unit 33 comprises a feature display unit 331.

The data input unit 311 is input by mask data 34 expressing a mask pattern and production process data 35, including the number of processes and a process category for each process such as etching, deposition, layering film thicknesses, and a depth of scraping off, for example. The cross-sectional feature setup unit 312 inputs and sets cross-sectional feature data 36 of a mask edge part. The calculation environment setup unit 313 inputs and sets up a calculation condition such as calculation range, and/or calculation accuracy, for example, to be calculated by the feature calculation unit 32.

The feature calculation unit 32 sequentially calculates features generated by respective processes based on each input condition which is input by the data input unit 311, cross-sectional feature setup unit 312 and calculation environment setup unit 313.

Next, the calculation result output unit 33 converts a model of a device as a calculation result calculated by the feature calculation unit 32 into simulation-use model data 37. The feature display unit 331 displays, as a three-dimensional feature, the model of the device as the calculation result of the feature calculation unit 32 in the display screen of the three-dimensional device simulation system 30.

The next description is of a flow of a three-dimensional device simulation process applied by the present invention.

FIG. 4 is a flow chart showing a flow of a three-dimensional device simulation process carried out in a three-dimensional device simulation system.

The three-dimensional device simulation process shown by FIG. 4 indicates the process from an input of a calculation condition to a display of a calculation result as a three-dimensional model. In this event, an example of the simplest three-dimensional device simulation process is that the process number is "1", and a process category is "deposition".

First in the step S41, the data input unit 311 extracts a feature of a mask pattern by inputting mask data 34.

Figure 5:
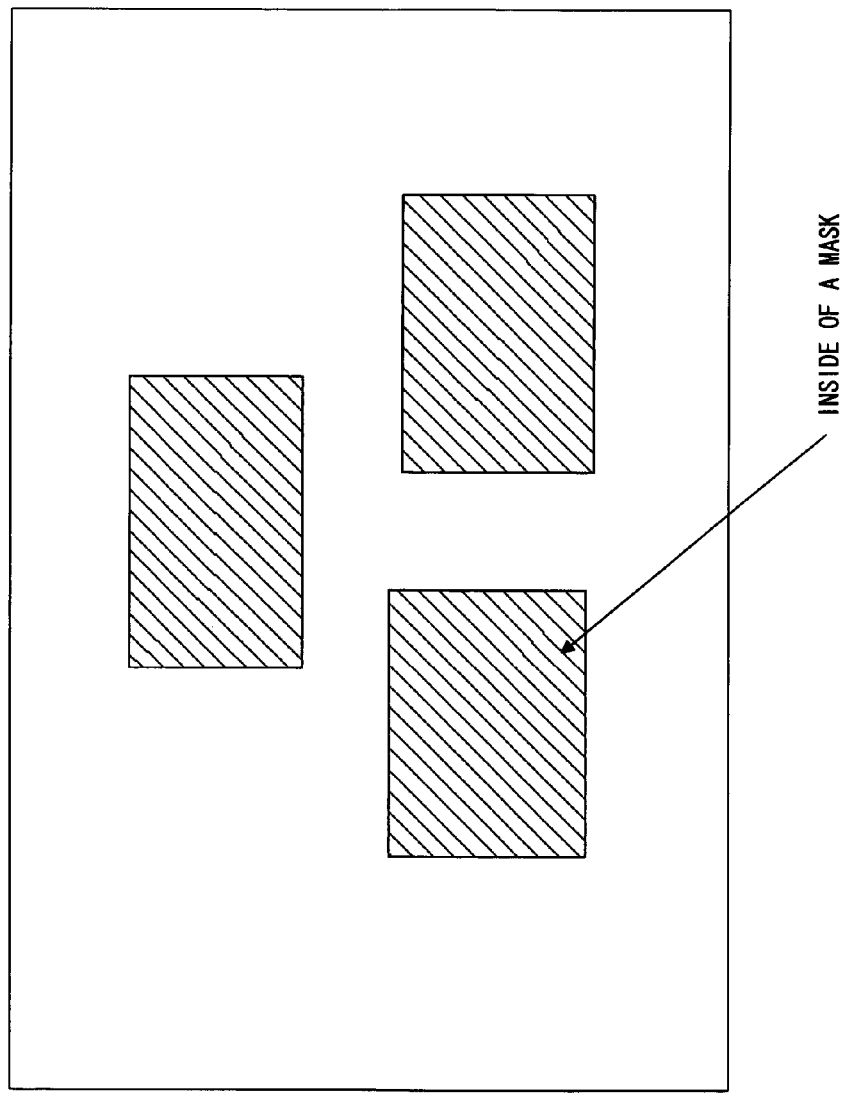
FIG. 5 is a diagram exemplifying mask data that is input.

FIG. 5 is a diagram exemplifying mask data that is input.

As shown by FIG. 5, the mask data is input by usually using a graphical user interface (GUI).

Returning to the description of FIG. 4, the data input unit 311 inputs production process data 35 including a process number, a process category, and/or a film thickness, for example, in the step S42.

FIG. 6 is a chart exemplifying production process data that is input into the data input unit 311.

Referring to FIG. 6, the input process data shows the process number being "7", with a mask pattern (number: 1) ejected onto the base layer (BASE) as the first layer, which indicates the process category of "deposition" and a film thickness of "0.3 mm".

Returning to the description of FIG. 4, in the step S43, the cross-sectional feature setup unit 312 inputs and sets the cross-sectional feature data 36 of the mask edge part of the mask data that has been input in step S43. The input and setup of the cross-sectional feature data 36 is described below.

The cross-sectional feature data 36 can easily be input and set by expressing a cross-sectional feature with an exponential function or a trigonometrical function, for example, and inputting it into the parameter of the function. For example, letting the horizontal axis be x and the vertical axis be y of the cross-section, it can be expressed by a quadratic function such as $y=-a*x^2$.

Figure 7:
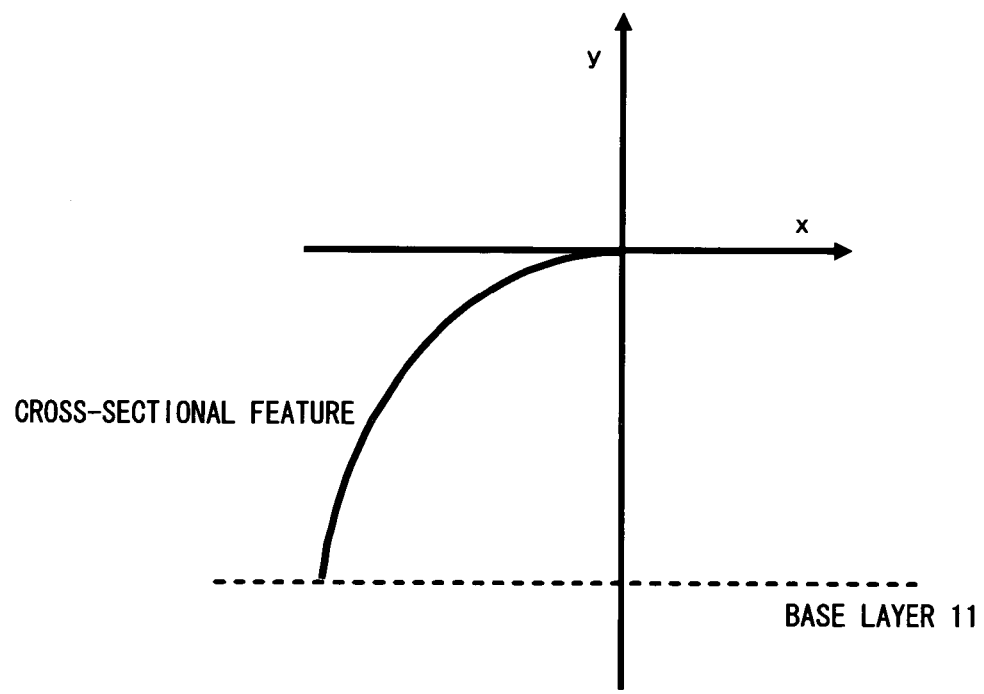
FIG. 7 is a chart exemplifying an expression of a cross-sectional feature by a quadratic function.

FIG. 7 is a graph exemplifying an expression of a cross-sectional feature by a quadratic function.

Referring to FIG. 7, a cross-sectional feature is expressed by a quadratic function of $y=-a*x^2$, and the inclination of the cross-sectional feature may be adjusted by changing the parameter of a. Additionally, an accurate cross-sectional feature can be input into the cross-sectional feature data 36 and set by extracting a contour from a cross-section photograph by image processing and specifying the contour data.

Returning to the description of FIG. 4, the calculation environment setup unit 313 inputs a calculation condition such as a calculation range, and/or a calculation accuracy, for example and sets a feature of the base layer 11 in the step S44.

Next, a subroutine of "calculation of a device feature" is executed in the step S45.

FIG. 8 is a flow chart showing a flow of a subroutine of "calculation of a device feature".

The subroutine of "calculation of a device feature" is carried out by two calculations, i.e., "calculation of a feature of a mask edge part" and "calculation of a feature of a mask inside area".

First, a subroutine, for example, "calculation of a feature of a mask edge part", is carried out in the step S81. Next, the "calculation of a feature of a mask inside area" is carried out in the step S82, which is implemented by techniques such as the offset method and the level set method.

The description below is of the subroutine of "calculation of a feature of a mask edge part" carried out in step S81.

Figure 9:
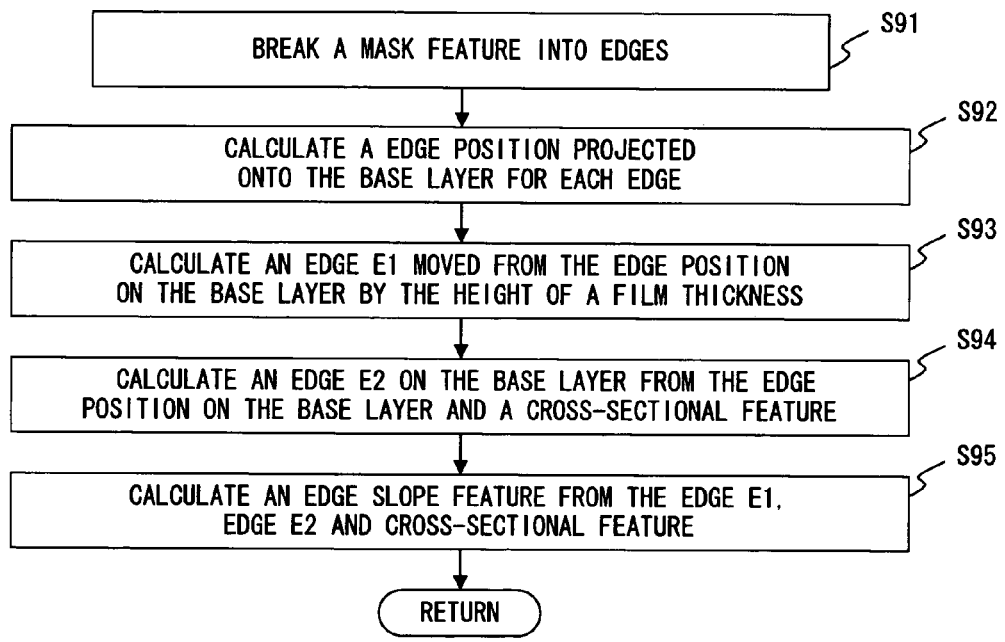
FIG. 9 is a flow chart showing a flow of a subroutine of "calculation of a feature of a mask edge part"
Figure 10:
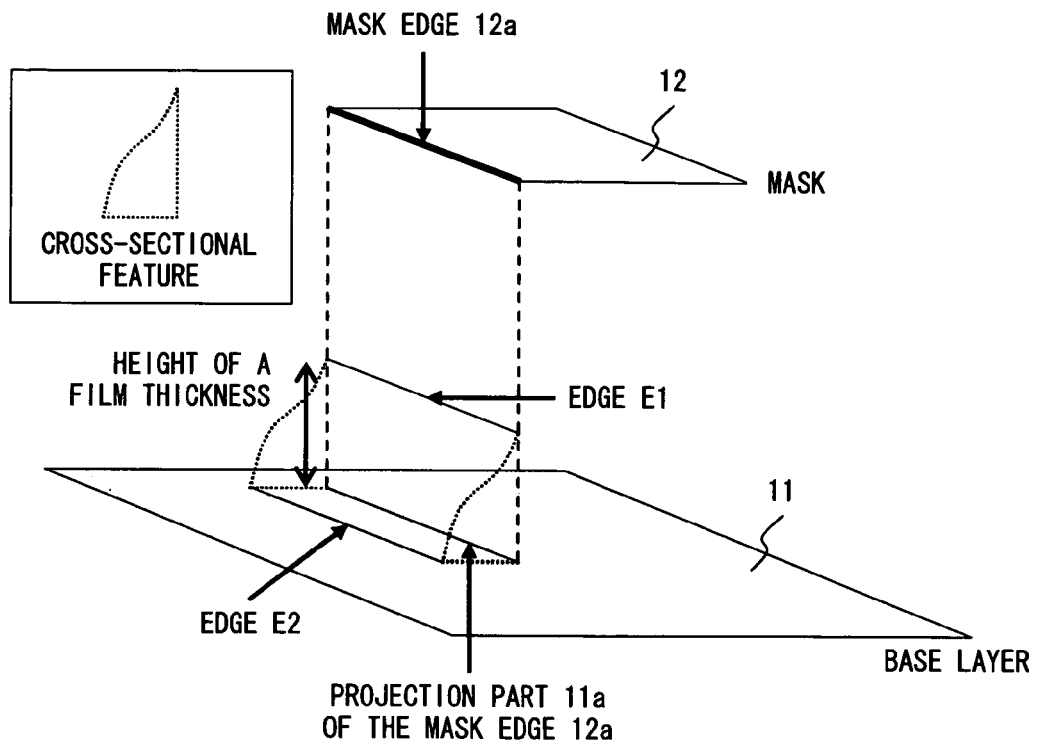
FIG. 10 is a drawing depicting an outline of a subroutine of "calculation of a feature of a mask edge part"

FIG. 9 is a flow chart showing a flow of a subroutine of the "calculation of a feature of a mask edge part", and FIG. 10 is a drawing for describing an outline of a subroutine of the "calculation of a feature of a mask edge part".

In this "calculation of a feature of a mask edge part", cross-sectional feature data 36 is input as width, height and plot data of a point in a two-dimensional coordinate system for example, followed by a calculation of a feature which is carried out by matching a scale from the film thickness.

First the step S91 breaks the feature of a mask pattern (e.g., the first mask pattern 12) into a plurality of edge parts (i.e., mask edges). Then, the step S92 calculates and acquires an edge position projected onto the base layer 11 (i.e., the mask edge projection part 11a shown in FIG. 10) for each edge part (e.g., a mask edge 12a shown in FIG. 10).

The step S93 calculates and acquires an edge E1 that is moved from the edge position projected onto the base layer 11 (i.e., the projection part 11a) by the height of the film thickness. The step S94 further calculates and acquires an edge E2 on the base layer 11 from the edge position thereon (i.e., the projection part 11a) and the cross-sectional feature input in the step S43 shown in FIG. 4.

Then, the step S95 calculates and acquires an edge slope feature based on the edge E1 acquired in the step S93, the edge E2 acquired in the step S94 and the cross-sectional feature input in the step S43 shown in FIG. 4.

Figure 12:
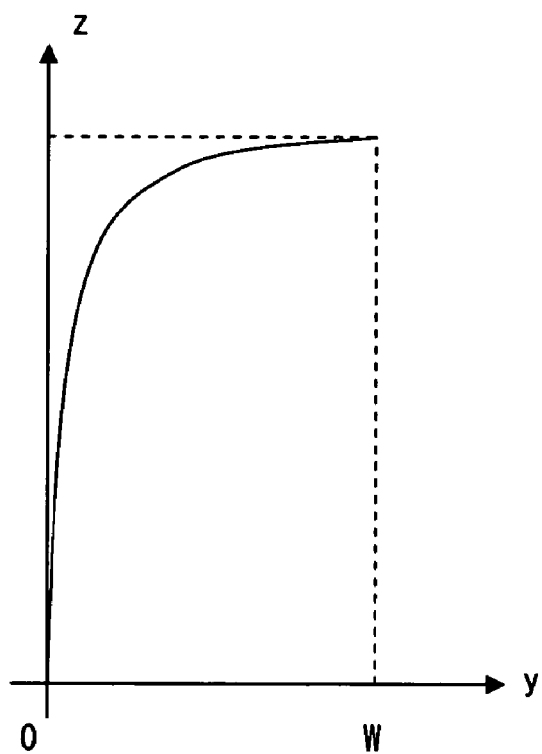
FIG. 12 is a chart describing a calculation of an edge slope feature (part 2)

FIGS. 11 and 12 are charts for describing a calculation of an edge slope feature.

Let the edge E1 and edge E2 be projected onto an x-y plane, with grid points $G_{ij}$ (where $0 \leq i < m$, and $0 \leq j < n$) being placed within a rectangular area which is enclosed by the two edges (i.e., the edges E1 and E2) (refer to FIG. 11). Then, letting a position on the surface on the base layer 11 be (xB, yB, zB) for the grid points $G_{ij}$ and a slope height be zS=F(yB), then the edge slope position right above the grid points $G_{ij}$ results in (xB, yB, zB+zS). Note that a cross-sectional feature can be expressed by z=F(y), y=W is the edge E1 position and y=0 is the edge E2 position (refer to FIG. 12).

Returning to the description of FIG. 4, the step S46 converts the device feature acquired in the step S45 into surface polygon data, and the feature display unit 331 displays the device model that is the calculation result as a three-dimensional feature in the display screen of the three-dimensional device simulation system 30 in the step S47.

The three-dimensional device simulation process applied by the present invention is carried out as described above.

Incidentally, variations occur to a feature of actually produced devices affected by various factors. In order to express such variations, a random unevenness is generated on the surface of a device feature, with the depth of dents, height of projections and density of the unevenness being specified in advance. Furthermore, other variations include a variation with regularity. For example, cross-sectional features are sometimes different between the mask edge on the right side (i.e., on the inside), and that on the left side (i.e., on the outside), of a device. In order to express this, what is provided is the capability of specifying the edge position of a mask pattern and the cross-sectional feature for it.

The next description is of a method for generating a corner part of the model.

Figure 15:
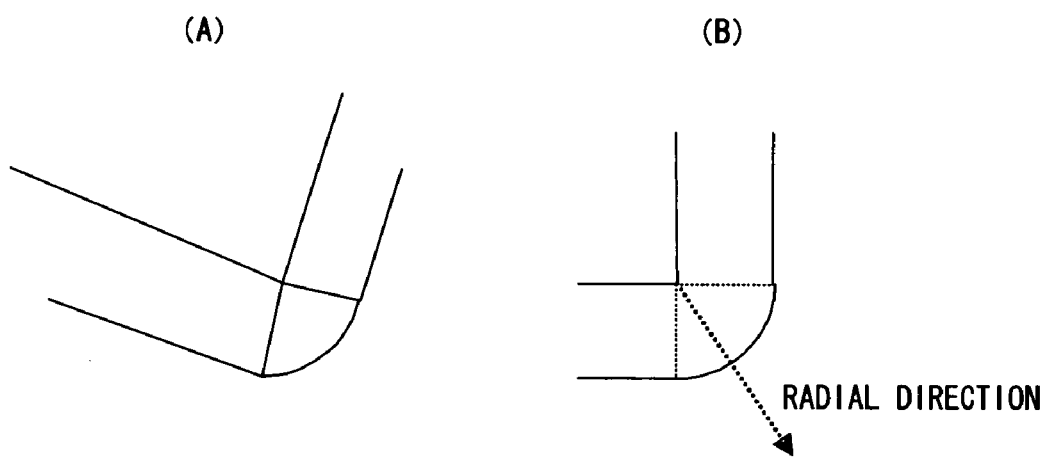
FIG. 15 is a drawing depicting a method for generating a corner part of a model (part 3)

FIGS. 13, 14 and 15 are drawings for describing a method for generating a corner part of a model.

As shown by FIG. 13, this embodiment of invention provides for the capability of specifying a method for generating a feature for the corner part of the model where two mask edges intersect with each other.

First, there is a method, as a first feature generation method, for extending the edge features, which are respectively generated based on two mask edges that sandwich a corner and intersect with each other (refer to FIG. 14). In this case, the cross-sectional feature of the corner part in the radial direction does not become the specified feature. Note that FIG. 14 (A) is a diagonal view looking at the model diagonally, and FIG. (B) is a plain view looking from above.

As a second feature generation method, there is a method for generating a feature with a cross-directional feature being rotated (refer to FIG. 15). In this case, the cross-sectional feature in the radial direction becomes as specified. Note that FIG. 15 (A) is a diagonal view looking at the model diagonally, and FIG. 15 (B) is a plain view looking from above.

Furthermore, an actual device feature may be sometimes reduced or enlarged vis-à-vis the mask feature depending on the production equipment used in the actual production process. Another possible result from production is a device displaced in the left and right direction or the up and down direction. In order to reflect this in a model, present embodiment provides for the capability of setting a shift amount of a mask edge position. Thus the present embodiment is capable of setting amounts of a parallel shift, a rotational shift and/or an enlargement/reduction. In the three-dimensional device simulation process, a mask feature is extracted from the input mask data 34, followed by making an edge component displaced in a specified direction by a specified amount and calculating a new mask edge position, thereby accomplishing the reflection of a shift occurring in an actual production process in a model.

Note that the above described embodiment of the present invention can be implemented by hardware, firmware such as a DSP (digital signal processor) board and a CPU (central processing unit) board, or software, as one function of the three-dimensional device simulation process.

While an embodiment of the present invention has so far been described by referring to the accompanying drawings, a three-dimensional device simulation apparatus applied by the present invention may of course be a single apparatus, a system or an integrated apparatus comprising a plurality of apparatuses, or a system carrying out processing by way of a network such as LAN, WAN, et cetera, so long as the above described functions are accomplished, in lieu of being limited by the above described embodiment.

Figure 16:
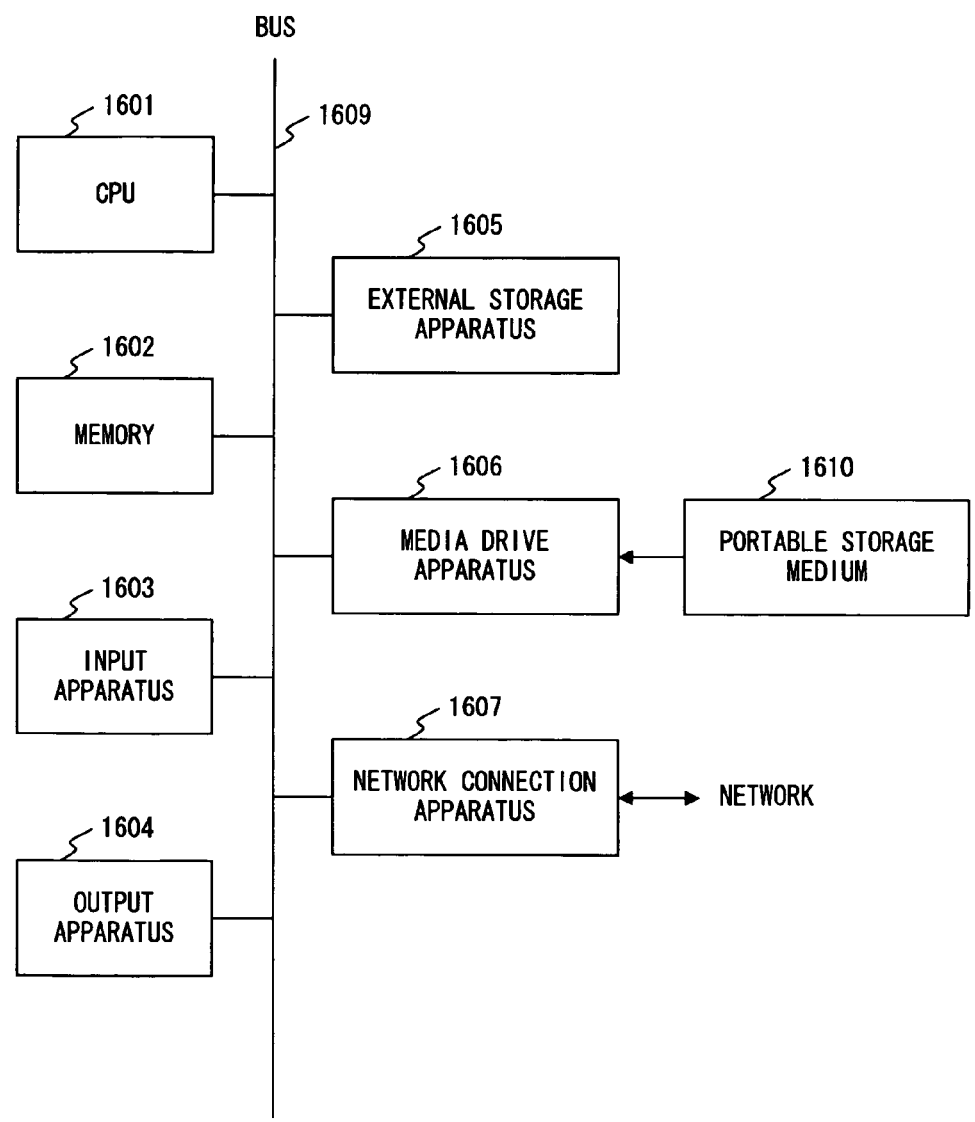
FIG. 16 is a diagram showing a hardware configuration of a three-dimensional device simulation system according to the present invention.

Also, as shown by FIG. 16, the present invention may be implemented by a system comprising a CPU 1601, memory 1602 such as ROM (read only memory) or RAM (random access memory), an input apparatus 1603, an output apparatus 1604, an external storage apparatus 1605, a media drive apparatus 1606 and a network connection apparatus 1607, which are all connected to a bus 1609. That is, it can apparently be implemented by supplying the three-dimensional device simulation apparatus with the memory 1602 such as ROM or RAM, the external storage apparatus 1605, or a portable storage medium 1610 which store a program code of the software implementing a system of the above described embodiment, and a computer comprised by the three-dimensional device simulation apparatus reading the program code and executing it.

In this case, the program code per se which is read from the portable storage medium 1610, et cetera, actually implements the new functions of the present invention, and the portable storage medium 1610, et cetera, storing the program code actually constitutes the present invention.

The portable storage medium 1610 can utilize, for example, flexible disk, hard disk, optical disk, magneto optical disk, CD-ROM, CD-R, DVD-ROM, DVD-RAM, magnetic tape, nonvolatile memory card, ROM card, or various storage media storing by way of the network connection apparatus 1607 such as e-mail and PC communications (i.e., a telecommunication line in other words).

Figure 17:
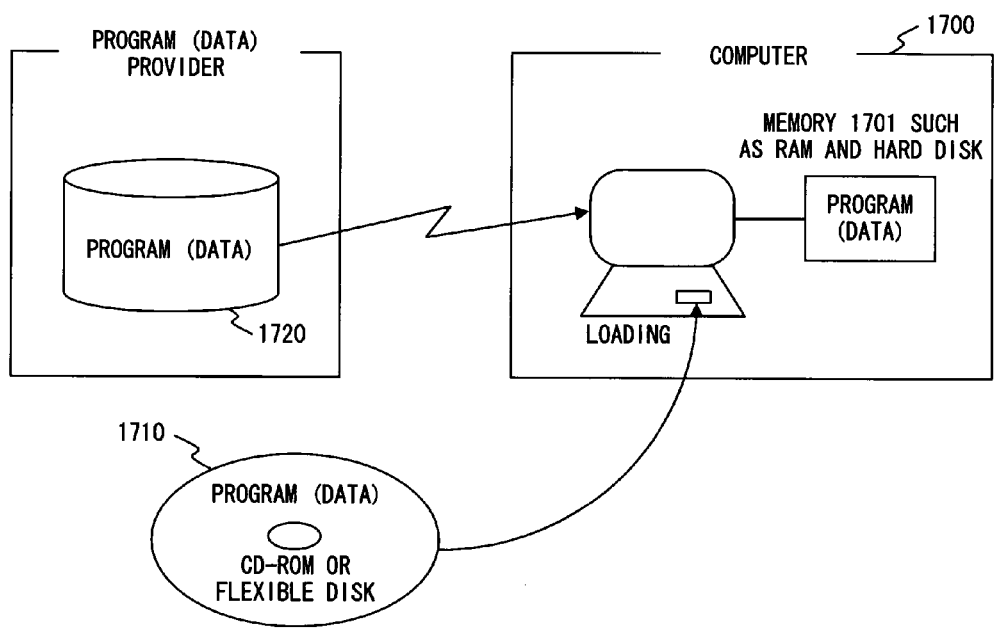
FIG. 17 is a diagram used for describing a loading of a three-dimensional device simulation program according to the present invention.

Additionally, as shown by FIG. 17, the functions of the above described embodiment is implemented by a computer (i.e., an information processing apparatus) 1700 executing the program code read onto memory 1701 and, in addition, the functions of the above described embodiment is implemented by the OS (operating system) operating in the computer 1700 executing a part or the entirety of the actual processing based on the instructions of the program code and by its processing.

Furthermore, the functions of the above described embodiment can be implemented by a program code, which is read from a portable storage medium 1710, or a program (and data) 1720 which has been provided by a program (and data) provider, that is written to a function extension board inserted into the computer 1700 or to memory 1701 comprised by a function extension unit connected to the computer 1700, followed by a CPU, et cetera, comprised by the function extension board or function extension unit carrying out a part or the entirety of the actual processing based on the instructions of the program code and by its processing.

In other words, the present invention can adopt various configurations or forms within the scope thereof in lieu of being limited by the above described embodiment.

The present invention enables a simple generation of a complex three-dimensional feature of micro/nano-devices by using a mask when generating a three-dimensional feature model thereof.

What is claimed is:

1. A computer-readable, non-transitory medium storing a three-dimensional device simulation program, which when executed by a computer, causes the computer to perform a method of generating a three-dimensional model of a device by using a mask data, the method comprising:
  acquiring cross-sectional feature information indicating a cross-sectional feature of an edge part of a mask; and
  calculating the three-dimensional model using the mask data and the cross-sectional feature information, wherein
  the calculating the three-dimensional model includes breaking a feature of a mask pattern indicated by the mask data into a plurality of edge parts, calculating a reference edge position projected onto a base layer for each of the edge parts, calculating a first edge position that is moved from the reference edge position on the base layer by a height of the film thickness, calculating a second edge position on the base layer from the reference edge position on the base layer and the cross-sectional feature information, and calculating an edge slope feature based on the first edge position, second edge position and the cross-sectional feature information.

2. The computer-readable, non-transitory medium according to claim 1, wherein the method further comprises:
  generating an uneven surface feature as a three-dimensional feature of said edge part.

3. The computer-readable, non-transitory medium according to claim 1, wherein
  said cross-sectional feature information is capable of specifying different cross-sectional features depending on positions.

4. The computer-readable, non-transitory medium according to claim 1, wherein
  a cross-sectional feature in a radial direction with a corner part being its center is the cross-sectional feature information as the feature of the corner part of said edge part.

5. The computer-readable, non-transitory medium according to claim 1, wherein
  a feature of a corner part of said edge part is a cross-sectional feature generated by moving a position of the edge part within a plane of said mask.

6. The non-transitory computer-readable storage medium according to claim 1, wherein
  said cross-sectional feature information expresses a cross-sectional feature of said edge part by a function and inputs the cross-sectional feature information by specifying a parameter of the function.

7. The non-transitory computer-readable storage medium according to claim 1, wherein said cross-sectional feature information indicates a cross-sectional feature of said edge part by using contour data extracted from a cross-sectional image.

8. A three-dimensional device simulation system for generating a three-dimensional model of a device by using mask data, comprising:

a cross-sectional feature acquisition unit to acquire cross-sectional feature information indicating a cross-sectional feature of an edge part of a mask; and a three-dimensional model calculation unit to calculate the three-dimensional model using the mask data and the cross-sectional feature information, wherein the three-dimensional model calculation unit breaks a feature of a mask pattern indicated by the mask data into a plurality of edge parts, calculates a reference edge position projected onto a base layer for each of the edge parts, calculates a first edge position that is moved from the reference edge position on the base layer by a height of the film thickness, calculates a second edge position on the base layer from the reference edge position on the base layer and the cross-sectional feature information, and calculates an edge slope feature based on the first edge position, second edge position and the cross-sectional feature information.

9. A three-dimensional device simulation system for generating a three-dimensional model of a device by using mask data, comprising:

cross-sectional feature acquisition means for acquiring cross-sectional feature information indicating a cross-sectional feature of an edge part of a mask; and three-dimensional model calculation means for calculating the three-dimensional model using the mask data and the cross-sectional feature information, wherein the three-dimensional model calculation means breaks a feature of a mask pattern indicated by the mask data into a plurality of edge parts, calculates a reference edge position projected onto a base layer for each of the edge parts, calculates a first edge position that is moved from the reference edge position on the base layer by a height of the film thickness, calculates a second edge position on the base layer from the reference edge position on the base layer and the cross-sectional feature information, and calculates an edge slope feature based on the first edge position, second edge position and the cross-sectional feature information.

* * * * *